United States Patent [19]

De Giacomi

[11] Patent Number: 5,112,104
[45] Date of Patent: May 12, 1992

[54] CAR SEAT COVER HAVING THE APPEARANCE OF ANIMALS

[76] Inventor: Giancarlo De Giacomi, Via Legnano, 6-Garbagnate (Milano), Italy

[21] Appl. No.: 591,901

[22] Filed: Oct. 2, 1990

[30] Foreign Application Priority Data

Oct. 2, 1989 [IT] Italy ............................. 21863/89[U]
Mar. 16, 1990 [IT] Italy ............................. 20844/90[U]

[51] Int. Cl.⁵ .......................................... A47C 31/10
[52] U.S. Cl. ................................... 297/229; 297/181; 297/188
[58] Field of Search ............... 297/218, 219, 181, 229, 297/228, 227, 188; 5/432

[56] References Cited

U.S. PATENT DOCUMENTS

| | | | |
|---|---|---|---|
| 3,840,916 | 10/1974 | Jennings | 297/181 X |
| 4,693,511 | 9/1987 | Seltzer et al. | 297/219 |
| 4,695,092 | 9/1987 | Hittie | 297/181 X |
| 4,718,721 | 1/1988 | Pompa | 297/219 |
| 4,725,094 | 2/1988 | Greer | 297/220 X |
| 4,909,573 | 3/1990 | Barry et al. | 297/181 X |

FOREIGN PATENT DOCUMENTS 2342188 10/1977 France ................................. 297/181

Primary Examiner—Peter A. Aschenbrenner
Attorney, Agent, or Firm—Browdy and Neimark

[57] ABSTRACT

Cover for car seats consisting of a fabric sheath having the external appearance of the body of an animal with an upper portion to conform to the back of the seat, and a lower portion to conform to the sitting plane of the seat, two pairs of tubular members having the external appearance of the limbs of an animal each connected to said upper and lower portions, and a head portion having the external appearance of the head of an animal to conform to the head-rest of the seat. The tubular members are provided with internal pockets and/or internal thermally insulated receptacles, and/or additional upholstery.

4 Claims, 2 Drawing Sheets

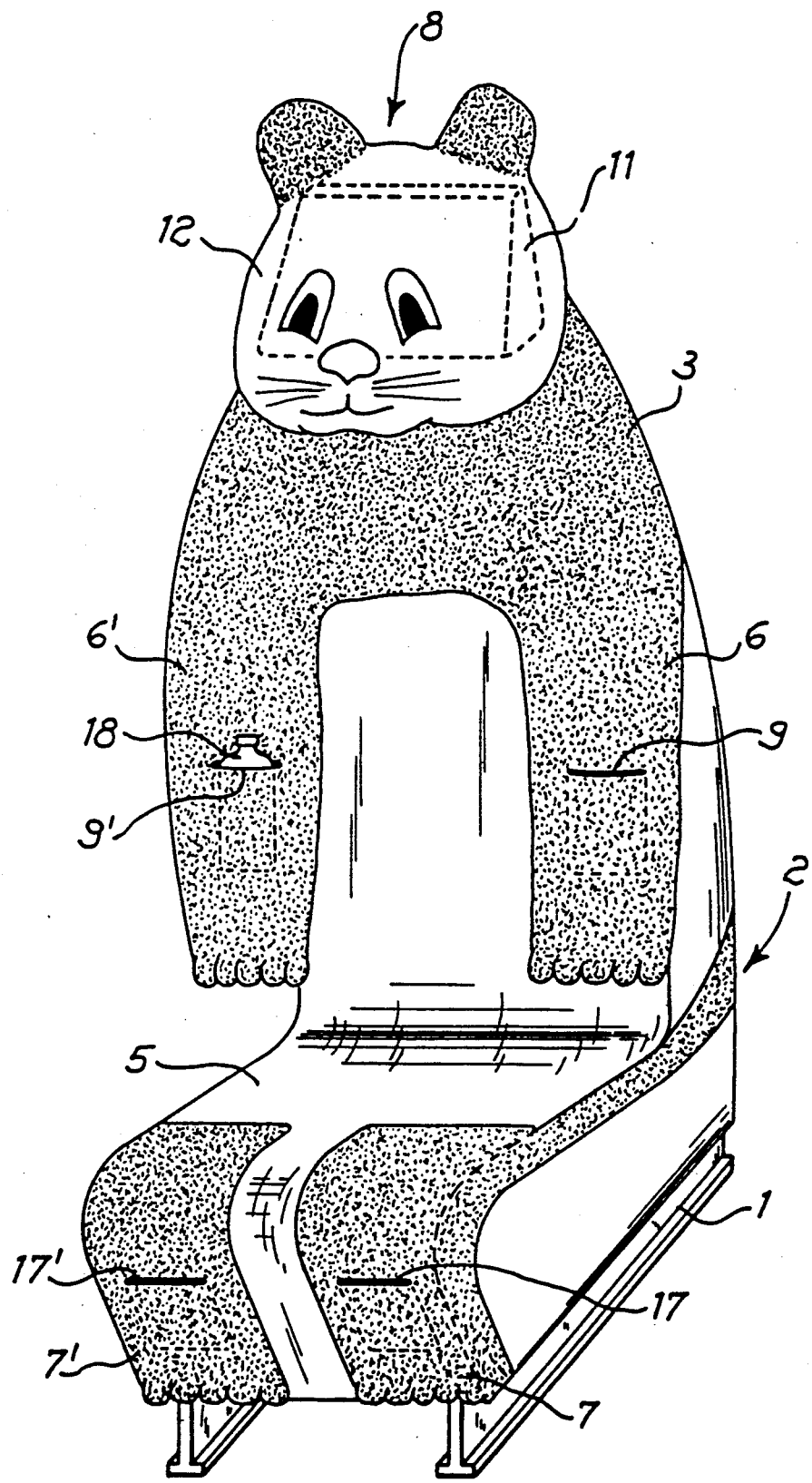

CAR SEAT COVER HAVING THE APPEARANCE OF ANIMALS

BACKGROUND OF THE INVENTION

The present invention relates to a cover for car seats, which has the appearance of an animal and is provided with additional upholstery as well as pockets and other useful receptacles.

THE PRIOR ART

It is known that many people prefer to cover the seats of their cars, expecially the front seats, which are the most used ones, in order to prevent them from rapidly getting dirty and worn. The covers known in the prior art are made with a fabric which is cut and sewn with a shape which practically corresponds to the seats to be covered. In the use the cover is put like a cap on the seat and is structured to conform to the size and the shape of the seat to be covered. For these purposes the known seat covers are made of an elastic or semi-elastic fabric.

It is also known that children usually do not like to sit for long time in a car and that they very often become fretful and annoyed, with the risk causing trouble to the driver, and any means useful for keeping children quite and patient in a car are welcomed.

SUMMARY OF THE INVENTION

It is therefore an object of the present invention to supply means particularly useful for keeping children in a car quiet and patient.

Another object of the present invention is to improve known car seats by providing them with additional upholstery, pockets and other useful receptacles.

These and other objects are achieved according to the present invention with a seat cover which has the appearance of an animal and wherein the limbs and other parts of the animal-like cover are used for housing additional upholstery pockets and other useful receptacles.

According to a preferred embodiment of the present invention, the seat cover consists of a sheath of fabric with an upper portion to conform to the back of the seat, having the external appearance of the upper or front part of an animal and a lower portion to conform to the seating plane of a seat having the external appearance of the lower of rear portion of an animal, two pairs of tubular members each connected to said upper and lower portions having the external appearance of the limbs of an animal, and a head portion to conform to a head-rest of the seat having the external appearance of the head of an animal.

The features and the advantages of the seat cover according to the present invention shall become evident to those skilled in the art from the following detailed description of some embodiments thereof.

BRIEF DESCRIPTION OF THE DRAWINGS

FIG. 2 is a perspective view of another embodiment of the seat cover according to the present invention.

DETAILED DESCRIPTION OF THE INVENTION

Figure 1:
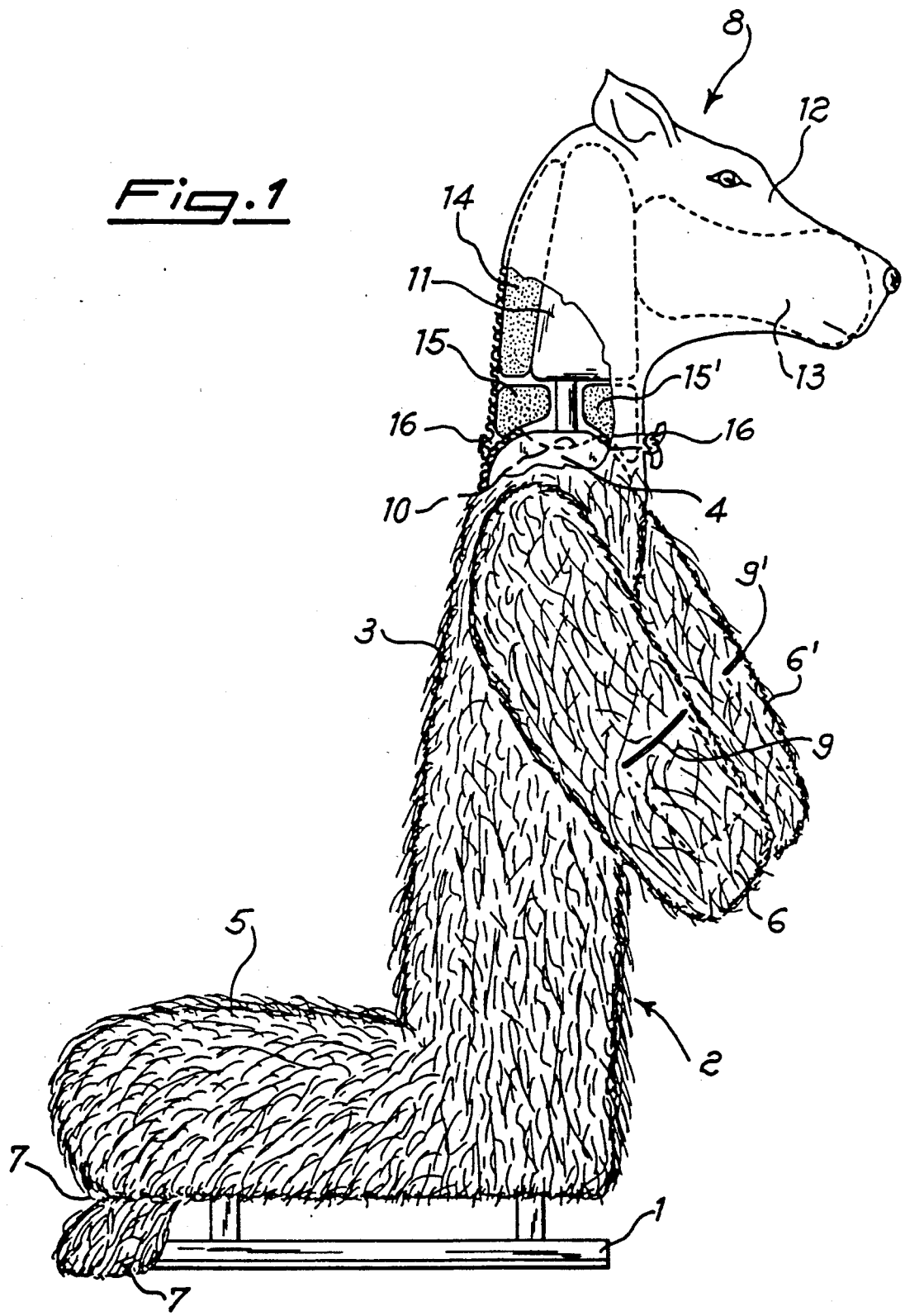
FIG. 1 is a partially sectioned side elevational view of a seat cover according to the present invention.

Referring now to FIG. 1 it can be seen in one embodiment of the seat cover according to the present invention, which has the appearance of a dog, the FIG. 1 shows a rail 1 supporting the car seat (which is not visible because it is covered by the seat cover). The cover mainly consists of a sheath 2 similar to the body of a dog with an upper portion 3 structured to conform to the back 4 of the seat and a lower portion 5 structured to conform to the plane of the seat, a head portion 8 to conform to the head-rest of the seat, and two pairs of tubular member 6, 6' and 7, 7' similar to the legs of a dog. Head portion 8 is partially sectioned in order to show its internal structure.

Sheath 2 is made of any fabric suitable to be used for seat covers, usually a semi-elastic fabric. According to a preferred embodiment of the present invention, sheath 2 is made of or covered with a material that gives to the seat cover the appearance of a soft animal, which is particularly welcomed by children. The same material is preferably used for the tubular members 6, 6' and 7, 7', as well as for the head portion 8. In FIG. 1 the head portion 8 appears to be made of a different material, but this is only for sake of clarity in the drawing.

Tubular members 6, 6' and 7, 7' are connected in any suitable way to the sheath 2. Preferably they are connected to sheath 2 in a detachable way, for instance with a zip. As shown in FIG. 1, each tubular member 6, 6' is provided with an internal receptacle whose openings are indicated with 9, 9'. The said receptacles are useful for containing toys, candies or other things useful for sitting children. According to a most preferred embodiment of the present invention, tubular members 6 and 6' are partially filled with a thermally insulating material such as PVC fibers, PTFE fibers etc. In the said embodiment the internal receptacles of the tubular members 6, 6' can properly house cold or hot drinks to be given to children during a trip. Openings 9 and 9' are preferably provided with a zip or similar closing device.

Sheath 2 is structured like the usual seat covers for cars, i.e. like a cap to be slipped on the back and the seating plane of the car seat. To this purpose, sheath 2 has a hole 10 for the passage of the head-rest 11 of the car seat. The upper part of sheath 2 is thus supported by the upper part of the back 4 of the car seat. The lower end of the sheath 2 is provided with the usual hook for fastening it to the bottom of the car seat.

Head portion 8 is slipped on the head-rest 11 and its face 12 is preferably oriented to the rear seat where children are usually seating. The head portion is preferably filled up with a soft material 13 useful for keeping the requested shape of the animal face 12. Filling 13 is particularly useful when the face 12 is protruding like the one of a dog and/or when head-rest 11 has a central gap (not shown in FIG. 1). Head portion 8 can also be provided with an additional upholstery 14 in order to make more comfortable, the head-rest 11 of the seat car. Additional upholstery 15 and 15' is preferably housed in the lower part of the head portion 8, in order to cover the bars support head-rest 11. The lower end of head portion 8 is internally provided with an elastic ribbon 16 which grips around the lower end of head-rest 11 and mates with the periphery of hole 10 in the upper part of sheath 2.

In FIG. 2 there is shown another embodiment of the seat cover which has the appearance of a cat. According to this embodiment, tubular members 7, 7' are provided with pockets 17, 17'. These additional pockets are very useful because they give the driver the opportunity to have in a very handy position, booklets, tickets, cards and other things to be used during a trip, but kept in a place not easily accessible to children. In FIG. 2 there is also illustrated a bottle 18 outgoing from opening 9'. The tubular members 6, 6' are hanging along the front surface of back 4 of the car seat. At any time they can be oriented to the rear seat as illustrated in FIG. 1. To this purpose the extremities of the tubular members 6, 6' are provided with strings (not shown) which can be tied together for keeping the said members in the position illustrated in FIG. 1.

In FIG. 2 the face 12 of the animal is oriented to the front of the car to better illustrate it in the drawing. The face of the animal, which is preferably oriented to the rear seat where the children are, can be easily oriented to the opposite direction because head portion 8 is independent from sheath 2 and is preferably structured to be slipped on head-rest 9 according two different orientations.

On the back side of head portion 8 there is upholstery 14 (not visible) for improving the comfort of head-rest 11. Upholstery 15 and 15' are omitted in this embodiment because the rather collapsed shape of a cat head covers the bars supporting head-rest 11.

It goes without saying that the cover according to the present invention, specially designed for the front seats of the cars, can be used also for the rear seats with only some minor and obvious changes. The same applies also to its use for the small seats specially designed for accomodating children in a car according to the law prevailing in many countries.

While there have been shown and described the novel features of the invention as applied to some preferred illustrative embodiments thereof, it will be understood that various omissions and substitutions and changes in the form and details of the illustrated embodiments may be made by those skilled in the art without departing from the spirit of the invention. It is the intention, therefore, that this invention be limited only as indicated by the scope of the claims appended hereto.

I claim:

1. A seat cover for a car seat having a seat cushion, a back-rest and a head-rest upwardly protruding from the backrest, comprising: a back-seat cover portion to envelope a back-rest of a car-seat; a seat-cushion cover portion joined to said back-rest cover portion; and a head-rest cover portion; said head-rest cover portion having inner cushioning means to make one side of the head-rest cover portion protrude from the head-rest, and disengageable connecting means between said head-rest cover portion and said back-rest cover portion; and wherein seat cover further comprises first and second foldable tubular members connected to sides of at least one of said back-rest and seat-cushion cover portions, said tubular members hanging freely from and being rearwardly disposed and forwardly foldable in respect to the back-rest of the seat; said seat cover being in the form of an animal shape in which said back-rest cover portion, said head-rest cover portion and said tubular members define body, head and limbs of said animal shape.

2. A car seat cover according to claim 1, wherein at least one of said tubular members is provided with a pocket.

3. A car seat cover according to claim 1, wherein at least one of said tubular members is provided with a thermally insulated pocket.

4. A car seat cover according to claim 1 in which engageable and disengageable connecting means are provided between each of said foldable tubular members and said seat cover.

* * * * *